United States Patent [19]

Manian

[11] Patent Number: 4,739,416
[45] Date of Patent: Apr. 19, 1988

[54] DIGITAL IMAGE REPRODUCTION

[75] Inventor: Bala S. Manian, Saratoga, Calif.

[73] Assignee: Matrix Instruments Inc., Orangeburg, N.Y.

[21] Appl. No.: 907,666

[22] Filed: Sep. 15, 1986

[51] Int. Cl.$^4$ .............................................. H04N 1/23
[52] U.S. Cl. ................................. 358/302; 346/107 R
[58] Field of Search .................... 358/280, 296, 302; 346/107 R, 108

[56] References Cited

U.S. PATENT DOCUMENTS

| | | | |
|---|---|---|---|
| 3,802,544 | 4/1974 | Howard et al. | 400/124 |
| 4,004,079 | 1/1977 | Boston | 358/283 |
| 4,024,518 | 5/1977 | Boston | 340/206 |
| 4,090,206 | 5/1978 | Pfeifer et al. | 346/107 R |
| 4,236,183 | 11/1980 | Howe | 358/214 |
| 4,255,764 | 3/1981 | Howe | 358/214 |
| 4,333,112 | 6/1982 | Matsumoto | 358/296 |
| 4,357,619 | 11/1982 | Klockenbrink | 358/302 |
| 4,419,691 | 12/1983 | Sing et al. | 358/75 |
| 4,505,578 | 3/1985 | Balasubramanian | 355/43 |
| 4,578,688 | 3/1986 | Okuno | 346/157 |

OTHER PUBLICATIONS

Castleman, Kenneth R., Digital Image Processing, publ. 1979, pp. 23-24.
Kawazu et al., "Application of Gradient-Index Fiber Arrays to Copying Machines", Applied Optics, vol. 19, No. 7, Apr. 1, 1980, pp. 1105-1112.
Hewlett Packard, "670 nm High Radiant Intensity Emitter", Technical Data, Jan. 1984, pp. 70-71.

Primary Examiner—Clifford C. Shaw
Attorney, Agent, or Firm—Thomas Schneck

[57] ABSTRACT

An apparatus for reproducing a digitized image from a semiconductor memory onto a light sensitive material using a plurality of movable equally spaced light sources. The sources direct light beams through apertures in a mask, movable with the sources, onto a sheet of the material disposed on a drum. The light sources emit beams of variable intensity responsive to image data recorded in memory devices. As the drum rotates, the mask and light sources move in unison longitudinally at a rate of one pixel width per drum revolution. One embodiment of a recording module comprises only light sources and mask, while another embodiment also includes a pair of lens arrays that image the beam onto the sheet. There are an integral number of pixel widths between adjacent beams. A plurality of parallel lines on the mask and a scanner fixed relative to the drum sense the relative position between the mask an the drum for providing corrective feedback information to a motor moving the mask and light sources. Color recording may be provided with a mask having three rows of apertures in which each row transmits a different one of red, green, and blue light beams. The film image contains a mosaic of pixels with each pixel mapping an element of memory.

25 Claims, 3 Drawing Sheets

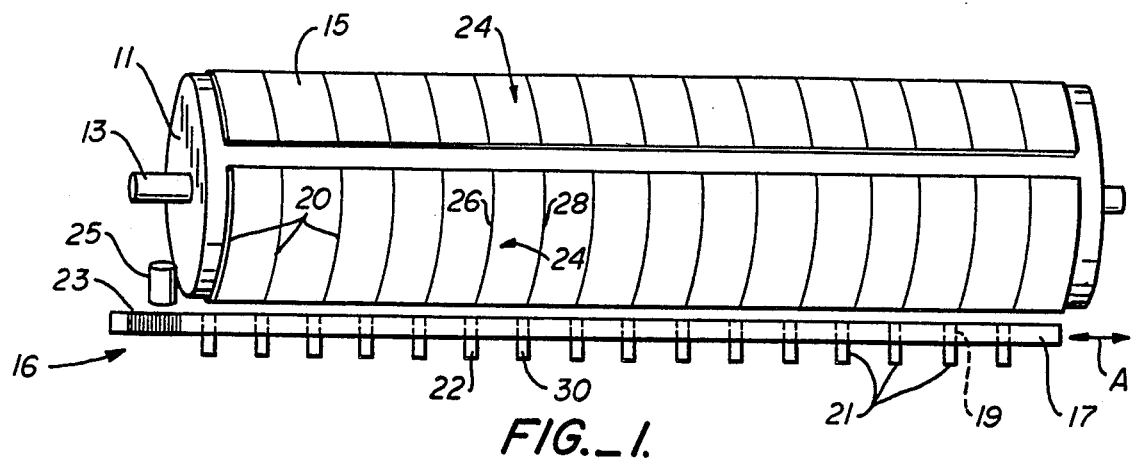
FIG._1.
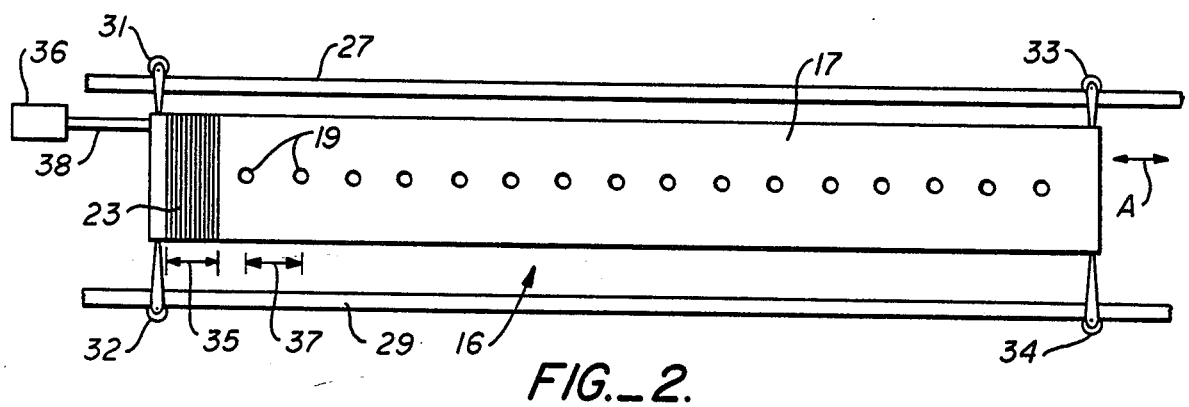
FIG._2.
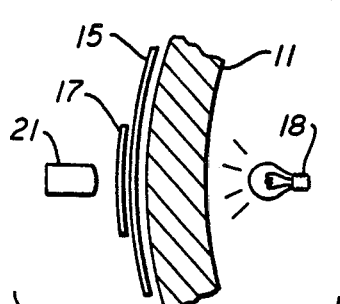
FIG._4.
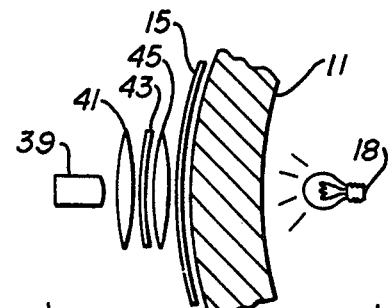
FIG._5.
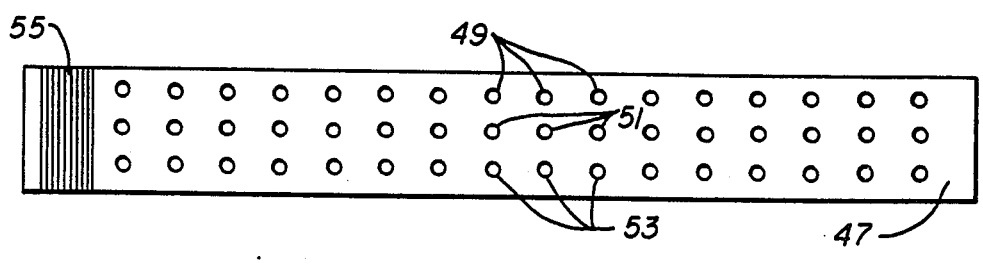
FIG._6.

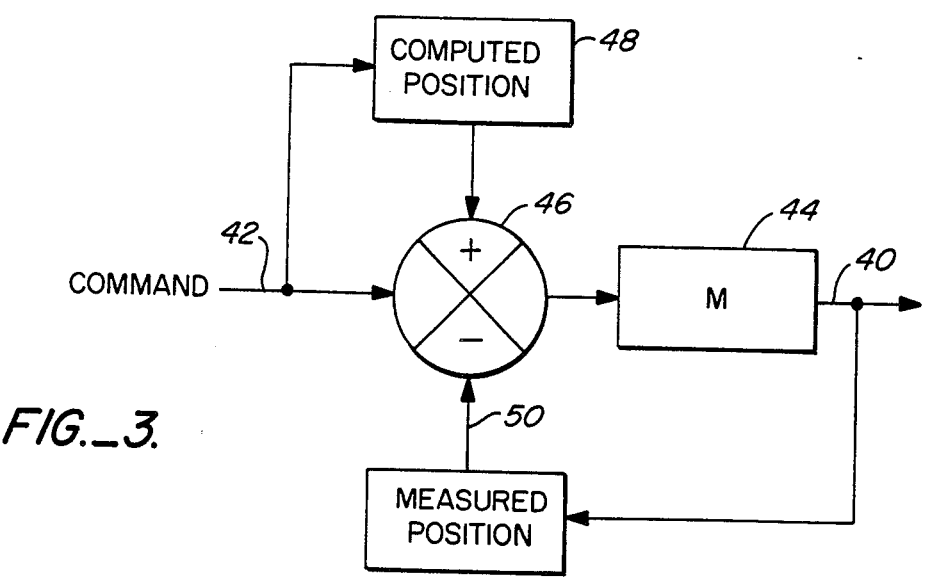
FIG._3.
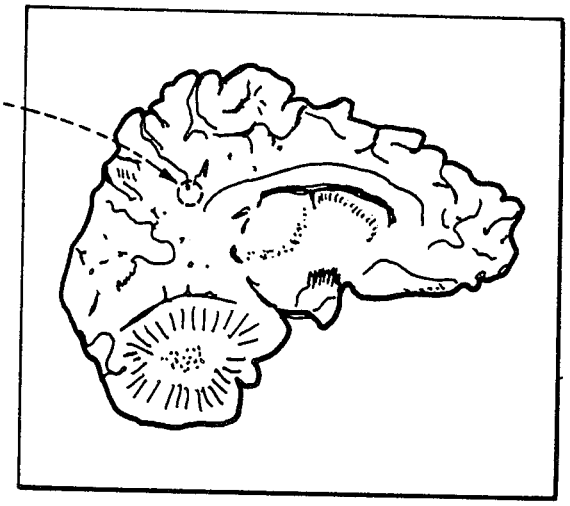
FIG._7A.
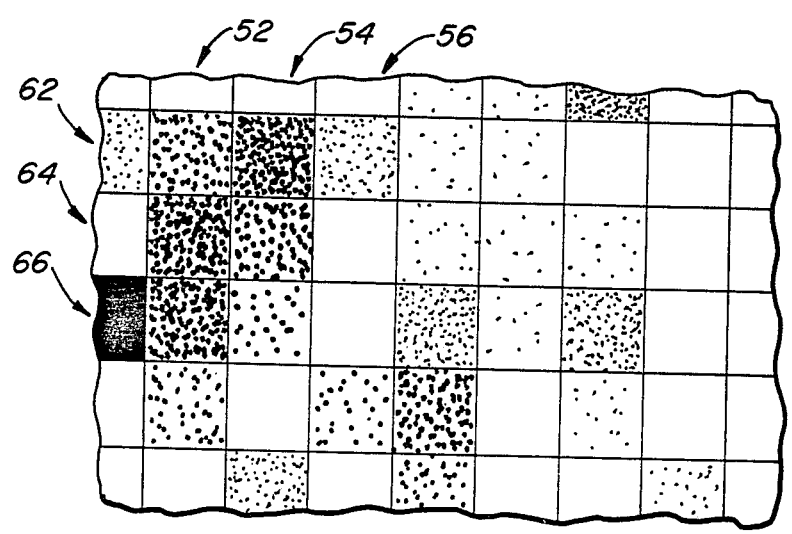
FIG._7B.

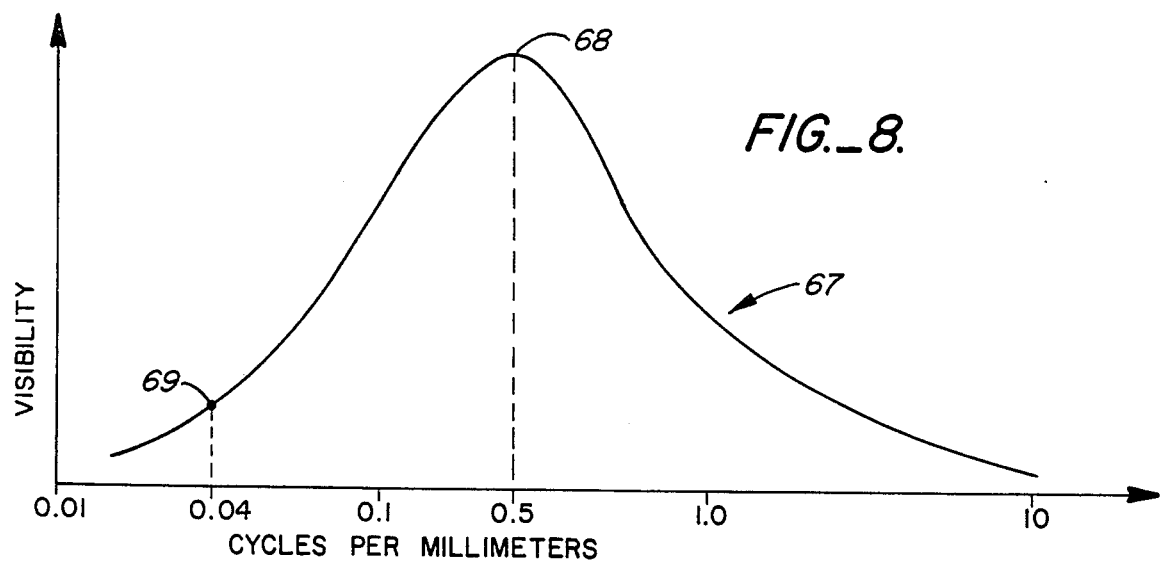
FIG._8.
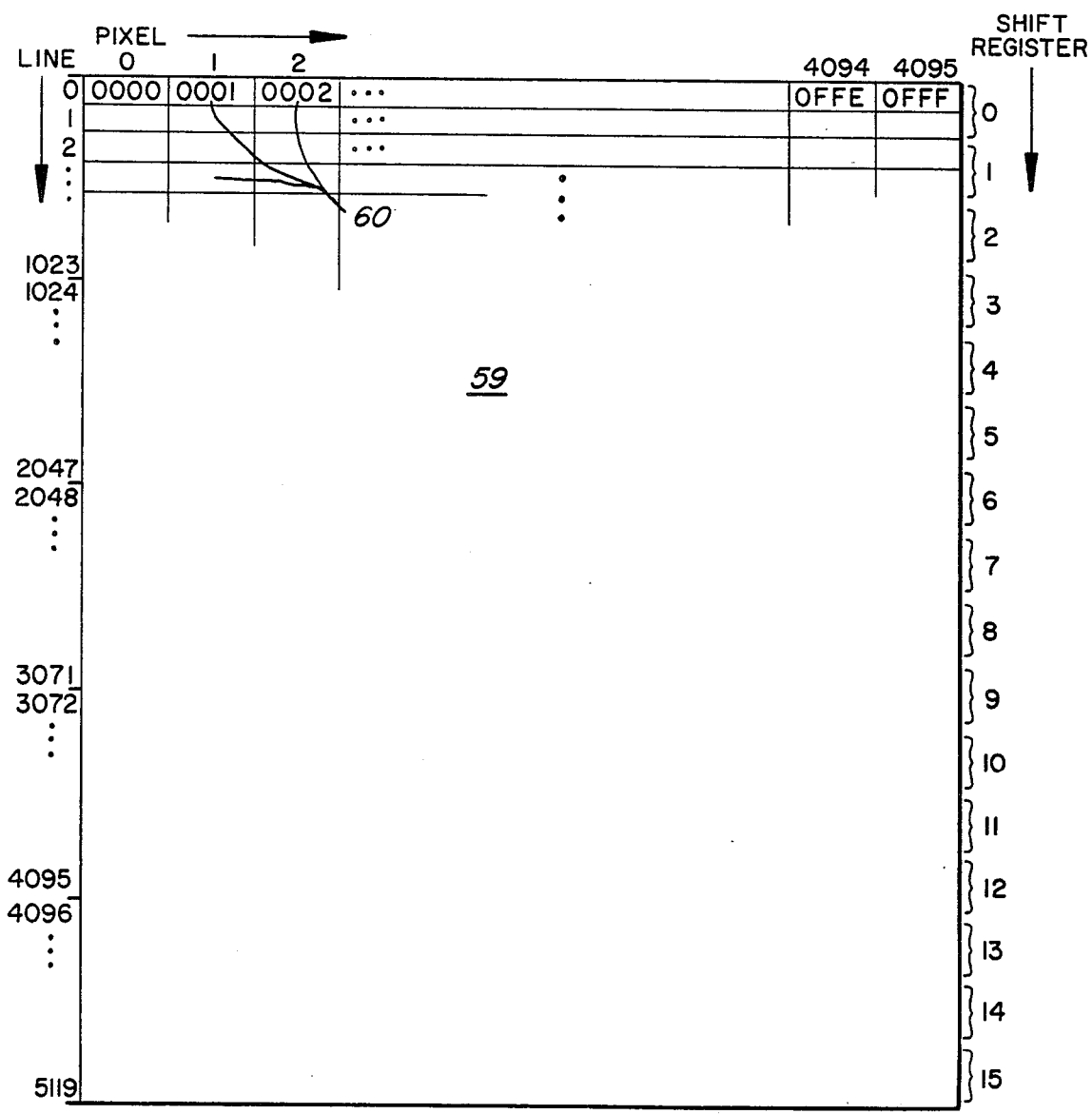
FIG._9.

DIGITAL IMAGE REPRODUCTION

TECHNICAL FIELD

The present invention relates to a method and apparatus for reproducing a digitized image, recorded in a computer memory device, onto light sensitive media such as photographic film, lithographic and photoengraving plates, and the like.

BACKGROUND ART

Because of the dramatic drop in cost of computer semiconductor memory, it is becoming economical and efficient to store image data in computer archival storage and use semiconductor memory as a temporary storage site. For example, in a large hospital hundreds of X-ray film images are made every day. In the past these X-ray films were often stored indefinitely. It has been recognized that computer mass storage of such images is preferable if the image can be reproduced with speed and accuracy. For example, such storage might be on optical or magnetic disks. But, a user must be able to convert the archival record back to film.

It is also desirable to produce hard film copies, or the like of images from CAT scanning and magnetic resonance imaging applications, as well as to produce lithographic and photoengraving plates of images directly from digital data for electronic graphic arts, printing and publishing applications.

In U.S. Pat. No. 4,505,578 to Balasubramanian, a photosensitive medium is disposed to receive scanning radiation from a laser for reproducing a digital image. Either the medium or the laser is mounted on a carriage which is propelled by a falling mass. The falling mass works against a hydraulic cylinder and piston in which hydraulic fluid is displaced from the cylinder. The laser produces a beam for scanning in a line transverse to the direction of motion of the carriage. The apparatus produces a mosaic of image pixels on a photosensitive sheet, the image pixels representing digital data.

There are present efforts devoted to devising image reproducers and recorders which are both faster and more compact without sacrificing the excellent image quality of prior devices. For example, a compact scanner/plotter is described in U.S. Pat. No. 4,024,518 to Boston. A photosensitive film is mounted on a rotatable drum. A scanning head moves on a precision leadscrew so as to scan the film in a helical fashion as the drum rotates. The medium receives an exposure that is a function of the gray levels of the image being recorded. Unfortunately, presently available leadscrews are not accurate enough to avoid misregistration between adjacent lines recorded on the medium, which typically are less than 100 microns wide. Further, most drum-type film recorders are slow, typically taking about five minutes to record an image on a 14 inch by 17 inch sheet of film. It would be desirable to record an image on such a film sheet in about twenty seconds. However, such a recording speed would require a drum speed of about 15,000 rpm, which is not practical.

An object of the present invention is to produce an apparatus for reproducing a digitized image on a light sensitive medium which is both compact, accurate and fast without sacrificing image quality.

DISCLOSURE OF THE INVENTION

The above objects have been met with an apparatus in which a light sensitive medium supported on a drum is exposed by beams, modulated by electrical representations of the contents of semiconductor memory cells, using a plurality of light sources, such as light emitting diodes (LEDs) to generate the beams. The beams are spaced apart at uniform distances along a line and directed at localized areas of the medium producing image pixels of a certain width. As the drum rotates, the beams move longitudinally, i.e., parallel to the drum axis, along parallel rails by one pixel width per drum revolution, thereby forming tightly woven helical lines of pixels. The beams are equally spaced by an integral number of pixel widths so that after that number of drum revolutions, the entire image has been exposed as a photographic latent image.

In one embodiment of the invention, an opaque mask, useful for defining the size and location of the beams, is positioned over a portion of the drum and has a plurality of equally spaced apertures, through which the beams are directed. The light sources and mask move in unison as the beams write helically on the medium. A plurality of parallel, circumferentially oriented position encoder lines are fixed relative to the beams on the mask or fixed relative to the drum, while a reference beam and detector are fixed relative to the other of the mask or drum. These encoder lines are used to measure the relative lateral or axial position between the mask and the drum, and thus between the beams and the medium on the drum. A servo controller compares expected or commanded position to the actually measured position and generates an error signal representing any deviation between the two. Servo motors in communication with the detector respond to the error signal and correct any position errors thereby preventing misregistration of adjacent lines of pixels.

Lens arrays may be positioned between light sources and the mask and between the mask and the medium. A first lens array images the light beams onto the mask. A second lens array images the mask onto the medium. The apertures on the mask may be either arranged in a single longitudinal line or three parallel longitudinal lines. In a color reproducer embodiment, each of three parallel rows of apertures transmits a light beam of a different color than the other rows of apertures, thereby enabling color recording of an image. The light sources emit beams at any of a plurality of different intensity levels so as to provide a gray scale when the latent image is photographically developed. The image is a mosaic of the pixels, each pixel mapping a single memory device location for a monochrome image and three memory locations for a color image. The memory is an array of data byte storage locations, with a one-to-one correspondence between memory device locations and image pixels for a monochrome image.

BRIEF DESCRIPTION OF THE DRAWINGS

FIG. 1 is a perspective view of a drum image reproducer in accord with the present invention.

FIG. 2 is a plan view of a mask-LED module on rails for use in the apparatus of FIG. 1.

FIG. 3 is a schematic of a servo system used in the apparatus of FIG. 2.

FIG. 4 is a schematic side sectional view of the apparatus of FIG. 1 using the module of FIG. 2.

FIG. 5 is a schematic side sectional view of the apparatus of FIG. 1 using a second module embodiment.

FIG. 6 is a plan view of a third construction for a mask-LED module for use in the apparatus of FIG. 1.

FIG. 7a is a digital image reproduction made in accord with the present invention.

FIG. 7b is a magnified portion of an image pixel mosaic from the reproduction of FIG. 7a.

FIG. 8 is a graph showing the relative visibility of gray scale differences as a function of the number of band cycles per millimeter.

FIG. 9 is a plan of a semiconductor memory showing the manner in which data is shifted out to modulate the LEDs.

BEST MODE OF CARRYING OUT THE INVENTION

With reference to FIG. 1, a drum-type image reproducer comprises a cylindrical drum 11 which is revolvable about axial supports 13 and which is capable of supporting a sheet 15 of light sensitive material on its circumferential surface. Typically, drum 11 is about 18 inches (45 cm) long and about 4.5 inches (11.4 cm) in diameter. The drum is thus capable of holding a sheet 15 as large as 14 inches by 17 inches (35 cm by 43 cm). Typically, drum 11 is rotatable at a speed of about 900 rpm. Typically, sheet 15 is an unexposed, red-sensitive photographic film, such as Kodak Ektascan film. Kodak Ektascan film is commonly used in the art for laser recording. Paper, plastic and metal lithographic and photoengravure photosensitive printing plates may also be used. Normal usage calls for a light tight enclosure or room, not shown, preserving the light sensitive character of the sheet.

The image reproducer further comprises an LED-mask module 16 located adjacent to sheet 15. Module 16 includes a movable opaque mask 17 with a plurality of equally spaced apertures 19 therein and a plurality of light sources 21, such as LEDs, with beams directed through the apertures. The apertures are circular and of equal size, serving to define the shape, size and position of the beams. The apertures 19 are positioned in a line along the length of the drum 11. Typically, the module has 16 apertures and 16 light sources. Each of the light sources 21 emits a beam of variable intensity which is directed through one of the apertures 19 onto sheet 15. Different beam intensity levels produce different shades of gray on sheet 15. Preferably, light source 21 emits beams with at least 256 discrete intensity levels. These levels are produced by a modulator which converts a stored digital signal to a corresponding analog signal, i.e., a digital-to-analog converter.

The preferred light sources are LEDs, such as Hewlett Packard's 670 nm High Radiant Intensity Emitter, model number HEMT-3300. This particular LED emits a beam with a peak wavelength of 670 nm and with a radiant intensity which varies linearly with the forward current. Typically, when the forward current is 10 milliamperes, the beam intensity is about 500 microwatts per steradian. The output rise time is about 120 nanoseconds, which is quite adequate for recording each picture element or pixel in about 15 microseconds. The beam emitted by the LED has divergence of 22 degrees and is collimated at the apertures to a divergence of about 5 degrees. Thus, the LEDs match characteristics of semiconductor lasers used for laser recording. Alternatively, lasers may be used for light sources 21.

Module 16 is movable in a longitudinal direction, parallel to axial supports 13, as indicated by arrows A in FIGS. 1 and 2. Mask 17 and light sources 21 move in unison together, the entire module riding on two longitudinally oriented parallel rails 27 and 29 adjacent to the drum 11, as shown in FIG. 2. Module 16 is shown movably supported on the rails 27 and 29 by wheels 31, 32, 33, and 34 fixed to the module. A servo motor 36 connected to module 16 via an arm 38 moves the module along the rails. Arm 38 may be a rod, cable, chain, gear or any other means which is known for connecting a motor to an element to be moved.

Position sensing for the LED-mask module 16 is provided by position encoder lines 23 on mask 17 and a scanner 25, seen in FIG. 1, which is fixed relative to the drum. Thus, lines 23 and scanner 25 sense the relative position between the apertures 19 in the mask 17 and the drum 11. Alternatively, the scanner may move with module 16 while the encoder lines 23 are fixed relative to the drum. Encoder lines 23 on mask 17 are preferred because any environmental factors, such as shrinkage of the mask, affect both the separation of apertures 19 and the separation between adjacent encoder lines equally. Scanner 25 comprises a light source, such as a laser, directing a beam at encoder lines 23 and a photodetector for receiving reflected or transmitted light from the encoder lines. Such scanners are well known and are commonly used for reading bar code. Actual position information obtained by scanner 25 is sent to the servo motor for controlling and correcting the position of module 16. Preferably, the position sensing apparatus has a resolution at least as small as a pixel width.

Position encoder lines 23 are parallel and generally directed circumferentially about the drum. Thus as the mask 17 moves longitudinally, scanner 25 encounters each of the lines 23 sequentially. Lines 23 are separated by an equal distance from each other, which is preferably equal to one pixel width. Thus, by tracking one line 23 for each complete drum revolution, accurate registration of adjacent pixel lines is possible. The width 35 of the set of lines 23 is preferably equal to the distance 37 between adjacent apertures 19. There are an integral number, typically about 320, lines 23 within this width 35. Measured position information is compared with either commanded or computed position information and the deviation is an error signal which is used as corrective feedback to the servo motor. Position information may be computed simply by multiplying the nominal rate of advance of the mask by the time over which advance occurs, yielding a distance or position. Mask travel is always from a marked, known home or zero position, so that the computed position is relative to the home position. The measured position is also relative to the home position.

In FIG. 3 a commanded or desired position for the movable mask is entered as an electrical signal along line 42 directed toward motor 44 through summing junction 46. From the command signal 42 a computed position signal is derived by an electrical circuit 48. This circuit may be a simple analogue multiplier computing distance from rate and time information relative to the home position, as previously described. Alternatively, it may be a simple counter circuit counting steps of a motor or a more elaborate circuit for computing position as if the system were an open loop system. The output of the computed position circuit 48 is a positive signal which is balanced by a negative signal from feedback loop 50. As long as no error is detected in measured position, the command signal drives motor 44 without offset by feedback. The output of motor 44 is an electrical signal taken along line 40 which drives lateral or axial motion of opaque mask 17 in FIG. 1 in the direction indicated by arrows A.

Returning to FIG. 3, a position measuring transducer, such as the scanner previously described makes a physical measurement of position and converts the measurement to an electrical signal representing mask position relative to the home location. This electrical signal is taken along line 50 and fed to summing junction 46 where it is compared to the computed position signal. Any difference in these two signals is an error signal which offsets the input command signal 42, providing a correction to the intput signal. This feedback is a servo control on motor 44 since the motor is typically current driven. A proportional increase or decrease in the driving current increases or decreases the output force in a proportional manner thereby adjusting the position of the mask. Another servo, similar to the servo shown in FIG. 3 governs drum rotational speed. Accurate and low-cost rotational servos are commonly used in high fidelity audio recording and playback from turntables and such a servo is adequate for the drum. Drum position is measured by circumferential closely spaced marks at the edge of the drum read by an optical scanner. The measured drum velocity is compared with the desired velocity and appropriate corrections are made by feedback to the drum motor.

With reference to FIG. 4, a sheet 15 of photosensitive material is disposed on a drum 11. A mask 17 covers a portion of sheet 15. A light source 21 directs a beam of light through an aperture in mask 17 onto sheet 15. Typically, the gap between the light source 21 and mask 17 is between 12 and 20 mils (300 to 500 microns). The gap between mask 17 and sheet 15 is about 20 mils (500 microns). For a mask 17 having apertures with diameters between about 25 and 45 microns, the beam divergence is collimated to about 5 degrees, and the resulting pixels on sheet 15 have a size between 70 and 90 microns on a side. The pixels are preferably circular, but their shape is governed by the shape of the apertures in the mask. Smaller apertures may be used to produce pixels having a size as small as 15 microns.

With reference to FIG. 5, a mask 43 again covers a portion of sheet 15 on drum 11. A light source 39 directs a beam through an aperture in mask 43 onto sheet 15. In this embodiment, a pair of lens arrays 41 and 45 are also present. A first lens array 41 is positioned between light source 39 and mask 43. Second lens array 45 is positioned between mask 43 and sheet 15. Lens arrays and their application are described in the article: Motoaki Kawazu and Yukio Ogura, "Application of Gradient-Index Fiber Arrays to Copying Machines," *Applied Optics*, vol. 19, no. 7, Apr. 1, 1980, pp. 1105-1112. In the present application, lens array 41 images the beam from light source 39 onto mask 43. Lens array 45 images the mask onto the photosensitive sheet 15. Sheet 15 is thus exposed in those places where the image of the illuminated apertures on the mask appears. The embodiment in FIG. 4, enables the gap between the mask and the sheet to be widened from only 20 mils (500 microns) to the image distance of lens array 45, typically on the order of several millimeters.

With reference to FIG. 6, a mask 47 that enables color images to be recorded has three rows 49, 51 and 53 of apertures. In each of the rows 49, 51 and 53, apertures are arranged in a line and spaced apart equally by an integral number of pixel widths. Typically, mask 47 has 48 apertures, 16 apertures per row, spaced about one and one-sixteenth inches apart. Rows 49, 51 and 53 are also spaced apart from each other by an integral number of pixel widths. A plurality of parallel equally spaced position encoder lines 55 are also provided on mask 47, and perform the same function as lines 23 in FIG. 2.

As in FIG. 2, light sources direct beams through the rows 49, 51 and 53 of apertures onto an unexposed photosensitive sheet for exposure of the sheet. In the present embodiment, red light is transmitted through apertures in first row 49, green light is transmitted through apertures in second row 51, and blue light is transmitted through apertures in third row 53. The particular order of colors for first, second and third rows of apertures is not essential. Red, green and blue LEDs or semiconductor lasers may be used as light sources. Alternatively, white light sources may be used in combination with red, green and blue filters over the respective rows of apertures.

The light sources are responsive to image data prerecorded in a memory to produce beams with a variable intensity that corresponds to the data. Since apertures in mask 47 are located in three separate rows 49, 51 and 53, data for each color of a particular pixel is sent to the three different color light sources with an appropriate time delay, so that the three colored beams for the same pixel expose the same spot on the sheet.

Referring again to the apparatus in FIGS. 1 and 2, as drum 11 rotates, module 16 moves longitudinally at a rate of one pixel width per drum revolution. Each LED 21 exposes sheet 15 in a sequence of adjacent lines 20 of pixels until the entire sheet is exposed. Since a plurality of LEDs are used, each LED need only be responsible for a single band of the image rather than the entire image. Thus, for example, LED 22 is responsible for recording a band 24 of the image beginning with lines 26 produced by LED 22 and extending to lines 28 produced by the adjacent LED 30. The number of LED light sources which may be used is subject to several practical constraints. The single source apparatus of the prior art typically takes over five minutes to record an entire image. Even a four-source apparatus requires nearly one and one-half minutes to record an image. Doubling the number of light sources, every other factor remaining the same, generally reduces the time required by half.

Cost and space limitations provide an upper bound to the number of light sources which may be used. For example, the Hewlett Packard LEDs described above have a width of 0.2 inch. So for an apparatus using those LEDs in close proximity to the mask and recording on 17 inch wide sheets, a maximum of 85 LEDs may be used. Light sources having smaller dimensions are continually being developed, and as these become available, they may also be used. The light sources may also be positioned remote from the rest of module 16 and be connected to the module via optically transmissive fibers. The LEDs must be modulated by a D to A converter at a sufficiently fast rate, or drum rotation must be sufficiently slow, so that each pixel or spot in a band can be different. A typical drum rotation rate is 900 revolutions per minute. At this rotation rate, with a 15 inch circumference drum, the LED modulation rate is 75 KHz. An entire image, as shown in FIG. 7a, is then a pixel mosaic wherein each pixel represents a corresponding byte in memory. The one-to-one correspondence between pixels and bytes in a monochrome image brings about the requirement for a large semiconductor image cache.

The one-to-one correspondence may be seen in FIG. 7b showing an enlargement of a portion of the processed film of FIG. 7a indicated by the dashed circle wherein each column 52, 54, 56 represents a scanning trace of a beam. The magnification is roughly twenty times. Within each column is a plurality of pixels, such as pixels 62, 64, 66 derived from a modulated light beam. Each pixel represents a byte of digital data, but expressed in terms of a gray scale level, indicated in FIG. 7b by dot density. An entire image is produced in this manner, with several beams operating simultaneously, each exposing pixels within a column until the space between columns has been completely filled by migration of the mask a short distance across the drum. That distance corresponds to the spacing between apertures in the mask. The image pixels have a sufficiently small size such that they are barely resolvable by the human eye, or not resolvable at all, without magnification. The human eye ignores boundaries between pixels when the gray scale contrast level is close. However, when the gray scale contrast level approaches maximum, lines may be seen, just as in regular photographic film. In common photographic film, grains of silver-halide emulsion might be 100 to 1000 times smaller than the image pixels of the present invention. The present invention may be characterized as artificially creating large grains of photosensitive silver corresponding in size to a pixel. If such pixels are considered as tiles whose gray scale may be adjusted by the modulated beam, the image of the present invention is then a mosaic pattern of such tiles.

FIG. 8 illustrates a third constraint to the number of permissible light sources. In practice, no two light sources are identical. Consequently, a band of the image recorded on the sheet by one light source may have a slight, but sometimes noticeable, difference in gray scale from an adjacent band recorded by a different light source. If the recorded image bands are narrow or wide enough, the human eye may not notice the difference in gray scale between adjacent bands. The curve 67, in FIG. 6, shows the relative visibility of a gray scale difference as a function of the number of cycles or bands per millimeter. At 0.01 cyles per millimeter, i.e., 10 centimeter wide bands, visibility is low. Similarly, at 10 cycles per millimeter, i.e., 100 micron wide bands, visibility is low. Visibility is at a maximum at point 68 on the curve, i.e., at 0.5 cycles per millimeter, corresponding to 2 millimeter wide bands.

For a 17 inch wide photosensitive sheet, 0.01 cycles per millimeter corresponds to approximately 4 light sources. As discussed above, this number of sources produces an apparatus which is slow. Ten cycles per millimeter corresponds to approximately 4,000 light sources. As discussed above, this number of sources requires more space than is available using presently available sources. Maximum visibility corresponds to about 200 light sources. Generally, any number of LEDs from about 50 to about 1000 produces bands on 17 inch wide sheets which are too visible to be desirable. Thus, 16 source apparatus are preferred. This corresponds to about 0.04 cycles per millimeter, i.e., point 69 on curve 67. Apparatus using 8 and 32 light sources are also acceptable.

With reference to FIG. 9, a semiconductor memory 59, typically associated with a computer, stores data representing the image to be reproduced. The storage device, such as a random access memory array stores one byte representing a gray scale contrast level for a pixel. There is one memory storage location for each pixel in the image so that there is a one-to-one mapping of memory storage locations to pixels. An image to be reproduced on a 14 inch by 17 inch sheet as an array of 85 micron size pixels requires about 20 million pixels and so a 20 megabyte semiconductor memory. Each 14 inch line of pixels requires 4,096 pixels. Typically, each pixel may be any of about 256 shades of gray, thus requiring eight bits to represent the gray scale of a pixel. Alternatively, twelve bits may be used to store up to 4,096 shades of gray. Therefore, semiconductor memory 59 requires twenty megabytes of storage for an image. Such a memory is the image cache previously mentioned. Color images require three image caches, one for each of the three primary colors, red, green and blue, used in FIG. 5. Twenty megabytes of semiconductor memory for an image cache may be formed, for example, from eighty 256K dynamic RAM chips. The three memories are mapped onto a single color sensitive film sheet by LEDs emitting light of the primary colors.

Memory 59 is a memory array of storage cells 60. Each of the storage cells contains a byte of image data representing a pixel of an image to be reproduced. Memory 59 is organized into successive lines of storage cells 60 representing successive lines of the image. In FIG. 9, lines of storage cells are numbered from 0 to 5119 on the left hand side of the figure. Typically, each line has about 4096 storage cells corresponding to pixels, numbered from 0 to 4095 at the top of FIG. 9. Memory 59 is further organized into groups of successive lines, corresponding to the sixteen shift registers numbered 0 to 15 on the right hand side of FIG. 9, and also representing bands of pixels in the image.

The number of light sources determines when lines of data are shifted out of memory 59. Each source is provided with a shift register tied to a group of data lines. For a sixteen source apparatus, sixteen shift registers are provided, numbered zero through fifteen in FIG. 9, for sixteen groups of lines. Each group, typically has about 320 lines. For example, shift register zero is tied to data lines 0 to 319, shift register one is tied to data lines 320 to 639, and so forth. Sixteen lines of data, one from each group, are simultaneously sent byte by byte via the sixteen shift registers to each of the sixteen light sources. Each eight bit gray scale byte that is read is converted to a corresponding digital electrical signal and then to a corresponding analog electrical signal. Each light source then emits light with an intensity which varies according to the analog signal which it receives. After each shift register has sent a complete line, the next successive group of lines is shifted out of memory, until the entire memory has been read.

Typically, a fourteen inch circumference drum rotates at a speed of about 900 rpm. Data must then be read at a rate of 67 milliseconds per line or 16 microseconds per byte. Speed at which data can be read from semiconductor memory is therefore generally not a factor, since read cycles on the order of 100 nanoseconds per byte are now common. Once a sheet has been fully exposed it contains a pixel mosaic forming a latent image of the digital data formerly in the memory. The latent image must be photographically processed in the usual way to make an image visible to the human eye.

The invention described above may be used to provide hard copy images of computer stored X-ray, magnetic resonance and tomography images. The invention is also applicable to electronic printing and publishing, through either the direct exposure of lithographic or photoengravure printing plates or the production of negatives for plate production. Images can be color separated, enhanced or otherwise manipulated by computer prior to recording the image on plates or film. This apparatus is both compact and fast, yet it does not sacrifice any of the image quality of the best prior art devices.

I claim:

1. An apparatus for reproducing a digitized image as a latent image on an unexposed light sensitive sheet comprising, a drum continuously revolvable about a longitudinal axis and capable of supporting a light sensitive sheet about the drum, a plurality of spaced apart light sources emitting beams of variable intensity light responsive to recorded digital image data from a memory, said beams producing pixels of a characteristic width on said sheet in a helical pattern, said beams being equally widths spaced apart on said sheet by an integral number of pixel widths, and means for moving said light beams longitudinally parallel to the drum axis an integral number of pixel widths per drum revolution.

2. The apparatus of claim 1 further comprising servo means for adjusting the longitudinal position of said light beams.

3. The apparatus of claim 2 wherein said servo means comprises position measuring means for detecting the relative position between said beams and said drum, including a plurality of parallel circumferential position encoder lines fixed relative to either said beams or said drum, the separation between adjacent lines being equal to said pixel width, and means fixed relative to the other of said beams or said drum for reading said position encoder lines.

4. The apparatus of claim 1 further comprising an opaque mask positioned over at least a portion of said drum and having a plurality of equally spaced apertures therein, said beams being directed onto said sheet through said apertures.

5. The apparatus of claim 4 further comprising a pair of lens arrays, a first of said arrays positioned between said light sources and said mask, a second of said arrays positioned between said mask and said medium, said first lens array imaging said beams onto said mask, said second lens array imaging said mask onto said sheet.

6. The apparatus of claim 4 wherein said apertures are arrayed in a single line parallel to said longitudinal axis.

7. The apparatus of claim 4 wherein said apertures are arranged in three rows parallel to said longitudinal axis, each of said rows of apertures transmitting light beams having a different color than adjacent rows of apertures.

8. The apparatus of claim 1 wherein said variable intensity light has a plurality of discrete intensities.

9. The apparatus of claim 1 further defined by a memory device having a number of storage locations equal in number to the pixels produced on the sheet.

10. An apparatus for reproducing a digitized image as a latent image on an unexposed light sensitive medium comprising, a cylindrical drum continuously revolvable about a longitudinal axis and capable of supporting a sheet of light sensitive material about said drum, an opaque mask positioned over at least a portion of said drum and slightly spaced apart therefrom, said mask having a plurality of apertures thereon, a plurality of modulated light sources emitting light beams of variable intensity responsive to recorded bytes of digital image data from a memory, said beams being directed through said apertures onto said sheet, there being a one-to-one correspondence between a byte of said beams, means for moving said mask and said light beams in unison, while the drum is revolving, said light beams producing pixels on the sheet of light sensitive material in a helical pattern, said mask and beams moving longitudinally one pixel width per drum revolution, there being an integral number of pixel widths between adjacent beams, the aggregate of all pixels forming a mosaic image.

11. The apparatus of claim 10 further comprising servo means for adjusting the longitudinal position of said light beams.

12. The apparatus of claim 11 wherein said servo means comprises
    (a) means for measuring the relative position between said beams and said drum, the position sensing means having a resolution at least as small as said pixel width,
    (b) means for commanding said beams to a desired position,
    (c) means for comparing the desired position to the sensed position and deriving an error signal, and
    (d) means for applying corrective feedback through said servo means.

13. The apparatus of claim 12 wherein said position measuring means comprises,
    a plurality of parallel circumferential position encoder lines on one of said mask and said drum, the separation between adjacent lines being equal to said pixel width, and
    means on the other of said mask and said drum for reading said position encoder lines.

14. The apparatus of claim 10 further comprising a pair of lens arrays, a first of said arrays positioned between said light sources and said mask, the second of said arrays positioned between said mask and said sheet on said drum, said first lens array imaging said beams onto said mask, said second lens array imaging said mask onto said sheet.

15. The apparatus of claim 10 wherein said apertures are arranged in a single row parallel to said longitudinal axis.

16. The apparatus of claim 10 wherein said apertures are arranged in three rows parallel to said longitudinal axis, each of said rows of apertures transmitting light beams having a different color than adjacent rows of apertures.

17. The apparatus of claim 10 wherein said light sources are light emitting diodes.

18. The apparatus of claim 10 wherein said light sources are lasers.

19. The apparatus of claim 10 wherein said variable intensity comprises a plurality of discrete intensities, one of said intensities being below the threshold of said light sensitive material, the others of said intensities being at different discrete levels above said threshold.

20. The apparatus of claim 10 further defined by a memory device having a number of storage locations equal in number to the pixels produced on the sheet.

21. A method for reproducing a digitized image on a light sensitive medium comprising,
    (a) placing a sheet of light sensitive medium around the surface of a drum,
    (b) positioning a mask over a portion of said sheet on said drum, said mask having plurality of apertures thereon, an aperture at one end of said mask being positioned initially at an edge of said film,
(c) continuously rotating said drum about a longitudinal axis of said drum,
(d) directing light beams through said apertures of said mask onto said sheet, said beams having a variable intensity responsive to recorded image data in a memory, the light beams producing pixels on said sheet in a helical pattern, said pixels having a width, and
(e) moving said mask and said light beams in unison longitudinally at a rate of one pixel width per drum revolution, the apertures in said mask being equally spaced at a distance equal to an integral number of pixel widths.

22. The method of claim 21 further defined by storing in storage cells of a memory array image data representing an image to be reproduced, each storage cell of the array containing a byte representing a pixel of a monochrome image, and converting each byte to an electrical signal modulating one of said variable intensity beams.

23. The method of claim 21 further defined by:
(a) measuring the relative position errors between said light beams and said drum with a resolution at least as small as said pixel width,
(b) correcting any position errors sensed so as to prevent adjacent pixels fro overlapping.

24. The method of claim 21 further defined by arranging said apertures in three rows parallel to said longitudinal axis, with light beams being directed through said apertures, in step (d) being of three different colors, each row of aperture transmitting a different color of light beam from the other said rows.

25. The method of claim 21 wherein sensing the position comprises reading a plurality of parallel circumferential encoder lines on one of said mask and said drum, the separation between adjacent lines being equal to said pixel width, a new line being encountered each drum revolution.

* * * * *